(12) United States Patent
Zhang et al.

(10) Patent No.: US 7,435,474 B2
(45) Date of Patent: Oct. 14, 2008

(54) ABRASION RESISTANT MONOFILAMENT FOR INDUSTRIAL FABRICS

(75) Inventors: Heping Zhang, Summerville, SC (US); Craig Valentine, Summerville, SC (US); Scott Quigley, Bossier City, LA (US)

(73) Assignee: Voith Patent GmbH, Heidenheim (DE)

( * ) Notice: Subject to any disclaimer, the term of this patent is extended or adjusted under 35 U.S.C. 154(b) by 376 days.

(21) Appl. No.: 11/170,049

(22) Filed: Jun. 28, 2005

(65) Prior Publication Data

US 2006/0009582 A1    Jan. 12, 2006

(51) Int. Cl.
*D03D 15/00* (2006.01)
*B32B 25/02* (2006.01)

(52) U.S. Cl. .................. 428/296.7; 442/181; 442/199

(58) Field of Classification Search ............ 442/181, 442/199; 428/296.7
See application file for complete search history.

(56) References Cited

U.S. PATENT DOCUMENTS

| 5,169,711 A | 12/1992 | Bhatt et al. |
| 5,700,881 A | 12/1997 | Wagner et al. |
| 5,763,512 A | 6/1998 | Schmitter |
| 7,138,449 B2 * | 11/2006 | Valentine et al. ............ 524/120 |

FOREIGN PATENT DOCUMENTS

| DE | 02 257 A1 | 7/2000 |
| GB | 1 157 343 A | 7/1969 |
| WO | WO 93/13251 | 7/1993 |
| WO | WO 00/56957 | 9/2000 |

OTHER PUBLICATIONS

European Search Report Nov. 18, 2005.

* cited by examiner

*Primary Examiner*—Lynda Salvatore
(74) *Attorney, Agent, or Firm*—Taylor & Aust, P.C.

(57) ABSTRACT

Monofilament made from a polymeric blend, wherein the polymer blend includes at least a first and a second polymer component wherein the first polymer component is polyamide (PA) 612 added to the blend in an amount of 50% to 99% by weight and that a second polymer component is at least one other polyamide added to the blend in an amount of 1% to 49% by weight and that per denier the monofilament has a resistance to withstand at least 60 cycles of abrasion testing.

17 Claims, 1 Drawing Sheet

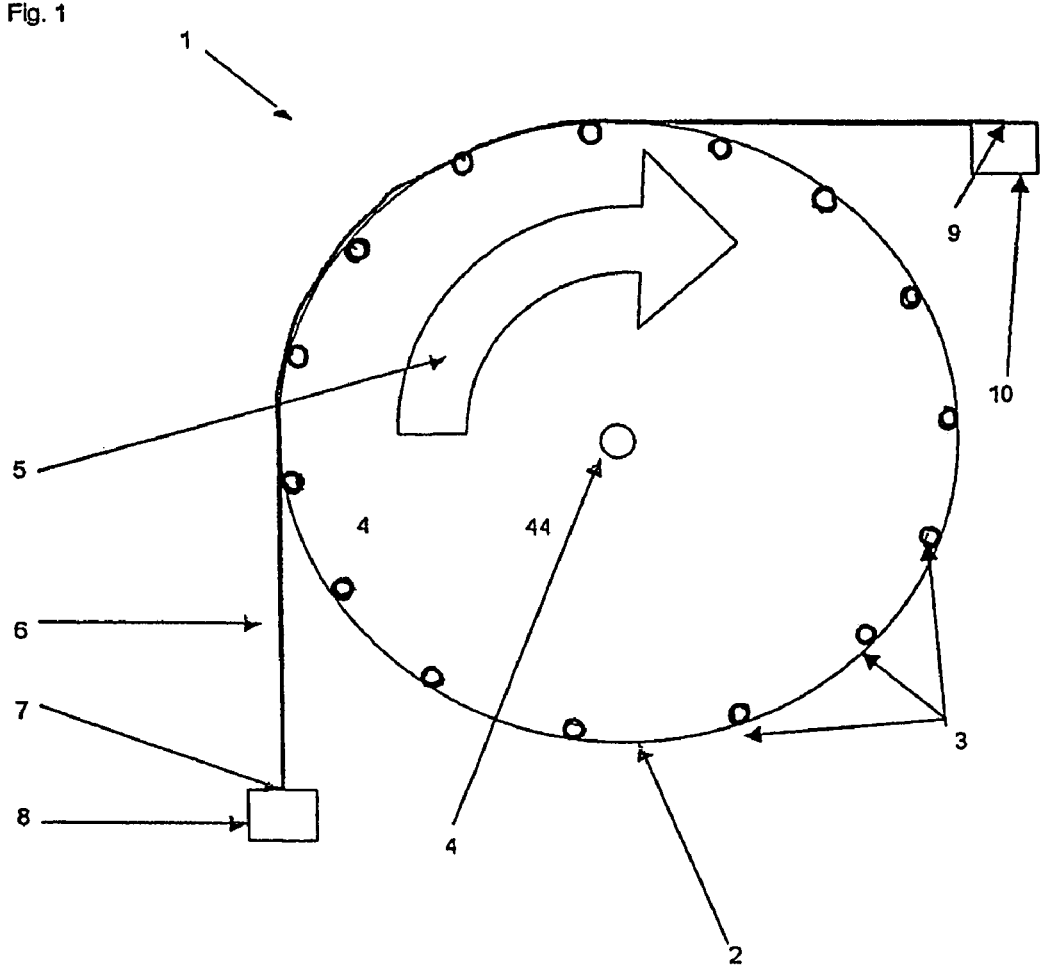

ABRASION RESISTANT MONOFILAMENT FOR INDUSTRIAL FABRICS

BACKGROUND OF THE INVENTION

1. Field of the Invention

The present invention relates to nylon monofilament yarns for use in industrial fabrics, particular for use in paper machine clothing such as forming fabrics, dryer fabrics or base cloths of press felts.

2. Discussion of Background Information

Paper machine clothing is subject to high abrasive stress due to underside rubbing against support elements and sealing elements such as vacuum boxes, and to the flow through of paper slurry containing abrasive paper fillers. The paper machine clothing fabrics are also subject to bending, stretching and constant flexing in a wet environment. The fabrics are required to keep their strength, dimensional stability, and planarity for as long as possible. Thus it is necessary that the fabric be resistant to abrasion from rubbing against the machine parts and from abrasive fillers in the slurry. It must possess sufficient dimensional stability to maintain sealing against the vacuum boxes and prevent excessive edge wear. The fabric must have adequate machine and cross machine direction strength and stiffness to resist the dynamic load and tension applied to it and the fabric must have sufficient chemical resistance to prevent degradation when subjected to the residual chemicals in the paper slurry and fabric cleaning processes. It has proven very difficult to manufacture a monofilament efficiently that can adequately satisfy these requirements in the fabric. It has proven very difficult to produce a fabric filament material, which is sufficiently resistant to all the stresses a forming fabric is subjected to.

Monofilaments made from polyethylene terephthalate (PET) have been the primary choice for forming fabrics. PET provides sufficient strength, modulus and dynamic stability to resist fabric deformation. It also provides good crimp interchange and the fabric is easily heat set to provide the desired mechanical properties. However, its abrasion resistance is not sufficient for many applications.

To date the most satisfactory solution to the problem of abrasion resistance involves the production of a fabric from polyester, specifically PET in the machine direction, and a blend of 50% polyamide and 50% polyester in the cross machine direction. Nylon (polyamide) 6 (PA6) and nylon 6.6 (PA66) have been the preferred choice for the abrasion resistant filament incorporated into a forming fabric, providing resilience to stresses in all directions. However, they have high moisture regain, which affects the crimp interchange, fabric stability after heat setting and fabric dimensional stability. The poor dimensional stability results in the phenomenon known as 'edge curl', which can restrict the application of polyamide filaments in forming fabrics. Furthermore, the reaction of PA6 and PA66 to certain chemicals used in the paper making process and in cleaning fabrics can lead to additional limitations in their applicability.

U.S. Pat. No. 5,169,711 discloses a modified PET material made by melt blending polyethylene terephthalate with a thermoplastic polyurethane (TPU) and extruded into monofilament. The material is claimed to provide adequate abrasion resistance conferred by the TPU phase whilst maintaining those properties provided by PET filaments.

Similar modifications incorporating TPU into other polyesters have been claimed by, for example, Publication WO 93/13251, U.S. Pat. No. 5,700,881, Publication WO 00/56957. All of these modifications by polymer melt blending, prove to be difficult to control, which affect the quality and consistency of the forming fabric filaments. A monofilament made from such a blend provides lower strength as compared to typical forming fabric monofilaments due to the poor compatibility between the two polymers.

Polyamide 612 (PA612) represents a different polyamide material from PA6 or PA66. PA612 typically has lower mechanical strength and stiffness than PA6 or PA66 but it absorbs much less moisture and therefore has better dimensional stability than PA6 or PA66.

However, monofilaments derived from PA612, as supplied, have lower abrasion resistance than the corresponding PA6 and PA66 filaments, and therefore compromise the performance of the fabric.

SUMMARY OF THE INVENTION

It is the purpose of this invention to provide a modified PA612 that provides abrasion resistance similar to that of PA6 and PA66 and superior to that of modified PET monofilaments, without sacrificing the enhanced dimensional stability that prevents the "edge curl" effect. Furthermore, it is possible to manufacture the filament by conventional monofilament extrusion processing, which incorporates a single extruder, with a two stage drawing process that can be carried out in hot air, water or steam, and a final annealing or relaxation step.

Monofilaments for use in industrial fabrics, particularly paper machine clothing are made from a polymeric blend including at least a first and a second polymer component, wherein the first polymer component is PA 612, which is added to the blend in an amount of 50% to 99% by weight and wherein the second polymer component is at least one other polyamide, which is added to the blend in an amount of 1% to 49% by weight. Further, the monofilament per denier has a resistance to withstand at least 60 cycles abrasion testing, wherein the test is performed as follows.

1. connect the monofilament at one end to a fixation and at the other end to a weight of 350 g,
2. place the monofilament over four steel wires of 0.029 inch diameter, the steel wires being fixed to a cylindrical drum having 15 of the steel wires, the steel wires extending parallel to the rotational axis of the drum and being equally spaced in circumferential direction at a drum diameter of 9 inch, the steel wires being under a tension of 45 kg±2 kg, such that the monofilament is in contact with four steel wires, the monofilament extends perpendicular to the steel wires and is under a load generated by the vertically free hanging weight,
3. rotate the drum with an angular frequency of 60 rounds per minute,
4. record the number of cycles to break per denier.

During testing, the monofilament is constantly in contact with four steel wires of the 15 steel wires.

It has been determined that an industrial fabric, particularly a paper machine fabric, having a woven structure formed by the interweaving of weft and warp yarns, wherein at least some of the weft and/or warp yarns are monofilaments according to the invention, has improved wear resistance per denier of the monofilament yarn. The yarn is able to withstand at least 60 cycles in the above described abrasion resistance testing procedure.

Polyamide yarns, in general, are only used in the backside of the fabric to provide abrasion resistance. As the polyamide yarn is exposed to conditions where it can absorb moisture from the atmosphere, it increases in length. This causes an imbalance in the dimension of the paper side and the wear side yarns, where the nylon is effectively longer than the PET yarns used in the paper side, thereby causing an upward edge curl of the fabric.

It was determined that a monofilament yarn being manufactured from a polymer blend that includes between 50% to 99% by weight PA612 as the first polymer component has a reduced tendency of moisture pick up, resulting in enhanced dimensional stability. Further PA612 improves the chemical resistance of the yarn.

An industrial fabric, particularly a paper machine clothing including at least some of the monofilament yarns according to the invention therefore has enhanced abrasion resistance, sufficient mechanical strength, sufficient stiffness. Further, such an industrial fabric can be readily subjected to heat set treatment without suffering the "edge curl" phenomenon.

The abrasion resistance of the monofilament yarn, according to the present invention, can be improved, if the second component is any of the following, either alone or in combination: PA 6 or PA 66 co-polyamide. This is because PA 6 or PA 66 is a material with excellent abrasion resistance.

Preferably the polymer blend includes PA 6 or PA 66 co-polyamides in an amount of 1% to 10% by weight giving an optimum balance between the improvement in wear resistance and dimensional stability. Selecting the amount for an optimum of improvement of wear resistance and dimensional stability.

The edge curl phenomenon is mainly influenced by differences in length change between the paper side weft PET and the wear side PA yarns. It has been found by the applicant that if at least some of the weft yarns of the fabric are Monofilament with a relative length change of less than 1.4% preferably of less than 1.2% the edge curl phenomenon can be reduced dramatically. The relative length change is the difference of a length of the monofilament after storage in water at 85° C. for 24 hours (at this stage the moisture pick up of the monofilament is considered saturated) and a length of the monofilament after hot air storage at 176° C. for for 5 minutes, divided by the length after hot air storage, and multiplied by 100.

Further, it was found that the abrasion resistance of the monofilament according to the present invention can be increased, if the polymer blend further includes ethylene-bis-stearamide in an amount of 0.001% to 0.5% by weight, preferably in an amount of 0.01% to 0.2% by weight. The ethylene-bis-stearamide preferably is added to the blend during the melt extrusion process.

The abrasion resistance of the monofilament yarn after heat setting can be further enhanced, if the polymer blend further includes at least one alkyl radical scavenger in an amount of 0.1% to 5% by weight. Preferred are alkyl radical scavengers, which are used alone or in combination with hindered phenols and/or hindered amines.

In addition the abrasion resistance of the monofilament yarn, after heat setting, can be further enhanced, if the polymer blend further includes at least one hydroperoxide decomposer in an amount of 0.1% to 5% by weight. Preferred are hydroperoxide decomposers, which are used alone or in combination with phosphites and/or thioesters.

Experiments have shown that the wear resistance of the industrial fabric can be increased if the monofilament yarn is capable of withstanding at least 60 cycles per denier abrasion testing, after being subjected to 176° C. for 10 minutes.

It has been found by the applicant that the life time of an industrial fabric, particularly of a paper machine clothing, subjected to the various severe environmental conditions during production can be enhanced, if the monofilament maintains a strength of 90% or more, as determined according to ASTM D2256-97, after storage in 3% sulphuric acid at 70° C. for 30 hours, preferably a strength of 80% or more after storage for 50 hours, most preferably a strength of 80% or more after storage for 70 hours or more.

The monofilament yarn according to the invention preferably is manufactured by a melt extrusion process.

It is further within the scope of the invention to provide a woven industrial fabric, wherein the woven structure is formed by the interweaving of weft and warp yarns, wherein at least some of the weft and/or warp yarns are monofilaments with the above identified properties and/or composition.

The industrial fabric, according to the invention, can be a paper machine clothing, preferably a forming fabric, or a dryer fabric or a base structure of a press felt.

BRIEF DESCRIPTION OF THE DRAWINGS

The present invention if further described in the detailed description which follows, in reference to the noted drawing by way of non-limiting example of exemplary embodiment of the present invention, and wherein:

FIG. 1 shows a plan view of monofilament testing equipment.

DETAILED DESCRIPTION OF THE PRESENT INVENTION

The invention will be further illustrated by way of the following examples:

Table 1 shows seven fabric samples generated with different weft yarns. The samples were cut into strips of the same dimension and saturated in water at 60° C. for 19 hours. The degree of edge curl was measured by placing the sample on a flat surface and measuring the distance from the edge to the surface.

As can be seen in table 1, fabrics # 4-6, which contain wear side monofilament yarns according to the invention, are compared to standard fabric # 7, which contains wear resistant PA66 yarns known in the art, the edge curl is reduced by a factor of 2.

TABLE 1

| fabric # | warp yarn type | weft yarn type | edge curl/cm |
|---|---|---|---|
| 1 | PET | PET | 0.32 |
| 2 | PET | PET | 0.34 |
| 3 | PET | PET | 0.37 |
| 4 | PET | PET + yarn 1 of the invention alternating | 0.8 |
| 5 | PET | PET + yarn 2 of the invention alternating | 0.62 |
| 6 | PET | PET + yarn 3 of the invention alternating | 0.64 |
| 7 | PET | PET + PA66 alternating | 1.3 |

Table 2 shows a comparison of the abrasion resistance between different PA66 wear resistant yarns as known in the art and different monofilament yarns according to the invention. The measurements were performed according to the measurement method described above. All the measurements were performed after heat setting the yarns at 365° F. for 10 minutes. Further, the number of cycles to break of the monofilament yarns, according to the invention, are normalized to the number of cycles to break of the appropriate PA control yarns.

TABLE 2

| yarn | yarn ø [mm] | yarn load [g] | cycles to break [arbitrary unit] |
|---|---|---|---|
| invention 1 | 0.2 | 350 | 1.29 |
| standard PA66 | 0.2 | 350 | 1 |
| invention 2 | 0.22 | 350 | 1.31 |
| standard PA66 | 0.22 | 350 | 1 |
| invention 3 | 0.3 | 350 | 1.11 |
| standard PA66 | 0.3 | 350 | 1 |

As can be seen from table 2 the yarns noted as 'invention' 1-3 according to the invention have an abrasion resistance which is at least better by the factor of 1,11.

Taking table 1 in consideration with the monofilament yarns of the invention, industrial fabrics can be provided that have increased dimensional stability when compared to the PA6 and PA66 known in the art, due to lower moisture pick up, in combination with improved wear resistance.

FIG. 1 shows a schematic view of measurement equipment 1, on which a monofilament according to the invention is tested:

Measuring equipment 1 includes a cylindrical drum 2. Drum 2 holds 15 steel wires 3, each having a diameter of 0.029 inch. Drum 2 is rotatable around a rotational axis 4 as indicated by arrow 5. Steel wires 3 extend parallel to rotational axis 3 and are under a tension of 45 kg±2 kg. Further, steel wires 3 are arranged in an equally spaced in a circumferential direction at a drum diameter of 9 inches. Monofilament 6, to be measured, is connected at its one end 9 to a fixation 10 and at its other end 7 to a weight 8 of 350 g. For testing, monofilament 6 is placed on drum 2 in such a way that it lays over four of steel wires 3. Further, monofilament 6 extends perpendicular to steel wires 3 and is under a load generated by the vertically free hanging weight 8. To perform the test, drum 2 rotates with an angular frequency of 60 revolutions per minute. During testing monofilament 6 is at every time in contact with four of the 15 steel wires 3.

After the tested mono filament 6 fails, the number of cycles to break per denier is recorded.

While the invention has been described in detail, it will be apparent to one skilled in the art that various changes and modifications can be made therein without departing from the spirit and scope thereof.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

The invention claimed is:

1. A monofilament made from a polymeric blend, comprising:
a polymer blend having at least a first and a second polymer component,
wherein the first polymer component is polyamide (PA) 612 added to the blend in an amount of approximately 50% to approximately 99% by weight and wherein the second polymer component is at least one other polyamide added to the blend in an amount of approximately 1% to approximately 49% by weight and that per denier the monofilament has a resistance to withstand at least 60 cycles abrasion testing, wherein the polymer blend further comprises ethylene-bis-stearamide in an amount of approximately 0.001% to approximately 0.5% by weight.

2. The monofilament according to claim 1, wherein the second polymer component is at least one of PA 6 or PA 66 co-polyamide.

3. The monofilament according to claim 1, wherein the polymer blend comprises the second polymer component in an amount of approximately 1% to approximately 10% by weight.

4. The monofilament according to claim 1, wherein the monofilament has a relative length change of less than 1.4%, and wherein the relative length change is the difference of a length of said monofilament after storage in water at 85° C. for 24 hours and a length of said monofilament after hot air storage at 1760° C. for 5 minutes divided by the length after hot air storage and multiplied with 100.

5. The monofilament according to claim 1, wherein the monofilament maintains a strength of 90% or more after storage in 3% sulphuric acid for 30 hours.

6. The monofilament according to claim 1, wherein the monofilament maintains a strength of 80% or more after storage in 3% sulphuric acid for 50 hours.

7. The monofilament according to claim 1, wherein the monofilament maintains a strength of 80% or more after storage in 3% sulphuric acid for 70 hours or more.

8. The monofilament according to claim 1, wherein the polymer blend further comprises ethylene-bis-stearamide in an amount of approximately 0.01% to approximately 0.2% by weight.

9. The monofilament according to claim 1, wherein the polymer blend further comprises at least one alkyl radical scavenger in an amount of approximately 0.1% to approximately 5% by weight.

10. The monofilament according to claim 9, wherein the at least one alkyl radical scavenger is in combination with at least one of a hindered phenol and a hindered amine.

11. The monofilament according to claim 1, wherein the polymer blend further comprises at least one hydroperoxide decomposer in an amount of approximately 0.1% to approximately 5% by weight.

12. The monofilament according to claim 11, wherein the hydroperoxide decomposer is at least one of a phosphite and a thioester.

13. The monofilament according to claim 1, wherein the monofilament maintains its resistance to withstand at least 60 cycles per denier abrasion testing, after being subjected to 176° C. for 10 minutes.

14. The monofilament according to claim 1, wherein the monofilament is manufactured by a melt extrusion process.

15. An industrial fabric of claim 1 comprising a woven structure by interweaving of weft and warp yarns, wherein at least one of the weft and warp yarns is the monofilaments.

16. The industrial fabric according to claim 15, wherein the industrial fabric is a paper machine clothing, preferably a forming or a dryer fabric or a base structure of a press felt.

17. The industrial fabric according to claim 16, wherein the industrial fabric is one of a forming fabric, a dryer fabric and a base structure of a press felt.

* * * * *